United States Patent Office 2,835,698
Patented May 20, 1958

2,835,698

9//10-SECOSTEROIDS AND PROCESS FOR THEIR PREPARATION

Barney J. Magerlein, Kalamazoo, and John A. Hogg, Kalamazoo Township, Kalamazoo County, Mich., assignors to The Upjohn Company, Kalamazoo, Mich., a corporation of Michigan No Drawing. Application January 18, 1956
Serial No. 559,778

10 Claims. (Cl. 260—476)

The present invention relates to novel steroid compounds and is more particularly concerned with the 3-hydroxy-9//10-secosteroid selected from the group consisting of 3 - hydroxy-9//10-seco-1,3,5(10)-pregnatriene-11,20-dione, 3-hydroxy-9//10-seco-1,3,5(10)-isopregnatriene-11,20-dione, their 3-hydrocarbon carboxylic acid esters, and a process for the production thereof.

The products and the process of the present invention are illustratively represented by the following equation:

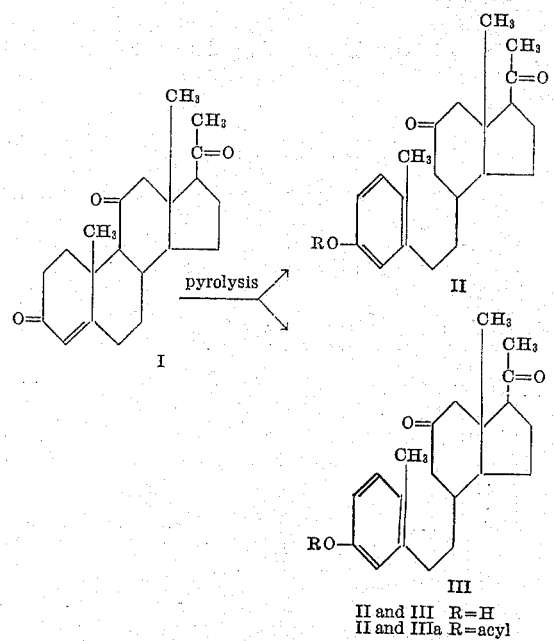

II and III R=H
II and IIIa R=acyl wherein R is selected from the group consisting of hydrogen and acyl, the acyl group being the acyl radical of a hydrocarbon carboxylic acid containing from one to eight carbon atoms, inclusive.

The process of the present invention comprises pyrolysis of 11-ketoprogesterone (I) at a temperature between 250 and 425 degrees centigrade, extraction of the phenolic fraction of the product and separation of the two isomers, 3 - hydroxy-9//10 - seco-1,3,5(10)-pregnatriene - 11,20-dione and 3-hydroxy-9//10-seco-1,3,5(10)-isopregnatriene-11,20-dione from each other by chromatography. Esterification of these isomers by conventional procedures using hydrocarbon carboxylic acid anhydrides or halides yields the 3 - acyloxy-9//10-seco-1,3,5(10)-pregnatriene-11,20-diones and 3-acyloxy - 9//10 - seco - 1,3,5(10)-isopregnatriene-11,20-diones, wherein the acyl group is that of a hydrocarbon carboxylic acid containing from one to eight carbon atoms, inclusive.

It is an object of the present invention to provide 9//10-secosteroids selected from the group of 3-hydroxy-9//10 - seco - 1,3,5(10) - pregnatriene - 11,20 - dione, 3 - hydroxy - 9//10 - seco - 1,3,5(10) - isopregnatriene-11,20-dione and the 3-esters thereof. Another object of the instant invention is to provide a process for the production of such 9//10-secosteroids. Other objects will be apparent to those skilled in the art to which this invention pertains.

The 3-hydroxy - 9//10 - seco - 1,3,5(10)-pregnatriene-11,20 - dione, 3-hydroxy - 9//10 - seco - 1,3,5(10) - isopregnatriene-11,20-dione, and their esters have estrogenic, glucocorticoid, antispermatogenetic, and luteoid activity. The compounds also have antibacterial activity, especially against Staphylococci such as *S. aureus, bovis, tenuis*, as well as Salmonella, especially *Salmonella schottmulleri* and the like. Furthermore, 3 - hydroxy - 9//10 - seco-1,3,5(10)-pregnatriene-11,20-dione is an important intermediate in the production of 9//10 - secocortisone and 9//10-secohydrocortisone esters (cf. Examples 25 and 26) which compounds have glucocorticoid and adrenalcortical activity. Similarly, 11β-hydroxy - 9//10 - secoprogesterone and 11-keto-9//10-secoprogesterone, which both possess progestational, luteoid, antiestrogenic, and fungicidal activity, are obtainable from the present 9//10-secosteroids (cf. Example 24).

In carrying out the process of the present invention 11-ketoprogesterone is heated to a temperature between about 250 to about 425 degrees centigrade, preferably between about 350 and about 400 degrees. The heating period is between one-half hour and twelve hours depending upon the temperature used, and is in the preferred embodiment between one-half hour and one and one-half hours at the preferred temperature of 350 to 400 degrees centigrade. The reaction mixture thereafter is cooled and the desired phenolic mixture containing 3β-hydroxy-9//10 - seco - 1,3,5(10) - pregnatriene - 11,20 - dione and the corresponding isomer is separated from the mixture by conventional procedures such as extraction, chromatography and recrystallization. The desired material, being a phenol, is usually extracted with alkali hydroxides such as sodium or potassium hydroxide, followed by reacidification of the thus obtained sodium, potassium or other salts. Separation of 3-hydroxy-9//10 - seco - 1,3,5(10)-pregnatriene - 11,20 - dione from 3 - hydroxy - 9//10-seco - 1,3,5(10) - isopregnatriene - 11,20 - dione is most conveniently achieved by chromatography as shown in detail in the examples. Final purification is achieved by similar conventional means such as additional extractions, chromatography or preferably recrystallization from suitable organic solvents, such as methanol, ethanol, propanol, Skellysolve B hexanes, ethyl acetate, acetone, or the like as deemed necessary.

The following examples are illustrative of the process and products of the present invention but are not to be construed as limiting.

*Example 1.—3-hydroxy - 9//10 - seco - 1,3,5(10) - pregnatriene - 11,20 - dione and 3-hydroxy - 9//10 - seco-1,3,5(10)-isopregnatriene-11,20-dione*

Ten grams of 11-ketoprogesterone was heated at a temperature between about 365 and 370 degrees for a period of 45 minutes. After this period the gassing decreased noticeably. About 165 milliliters of gas (at a pressure of 740 millimeters of mercury) was evolved in this reaction. Infrared analysis of this gas showed it to consist essentially of methane, with traces of ethylene, carbon dioxide and carbon monoxide. To the warm melt remaining, 25 milliliters of benzene and 100 milliliters of ether were added. The thus-obtained benzene ether solution was extracted three times with 25-milliliter portions of five percent sodium hydroxide solution. The aqueous sodium hydroxide extracts were combined and thereafter acidified with dilute hydrochloric acid to give 6.4 grams of material. The neutral fraction contained unreacted ketoprogesterone along with numerous unidentified materials. The phenolic fraction of 6.4 grams was dissolved in benzene and chromatographed over 500 grams of Florisil synthetic magnesium silicate taking portions of 1000 milliliters of Skellysolve B hexanes and Skellysolve B with acetone as given in the table.

TABLE

| Fraction No. | Solvent | Eluate Solids, Milligrams |
|---|---|---|
| 1-6 | hexanes | |
| 7 | hexanes-acetone 91:9 | 44 |
| 8 | hexanes-acetone 88:12 | 31 |
| 9 | do | 46 |
| 10 | do | 212 |
| 11 | do | 407 |
| 12 | do | 368 |
| 13 | do | 390 |
| 14 | do | 541 |
| 15 | do | 650 |
| 16 | hexanes-acetone 4:1 | 739 |
| 17 | do | 1,073 |
| 18 | do | 176 |
| 20-27 | hexanes-acetone 2:1 | 1,461 tars |

Fractions 10 through 12 (987 milligrams) were combined, the solvent evaporated and the remaining compound recrystallized from isopropyl alcohol to give 780 milligrams of 3-hydroxy-9//10-seco-1,3,5(10)-isopregnatriene-11,20-dione of melting point 159 to 160.5 degrees centigrade. $\lambda_{max.}^{EtOH}$ 289 millimicrons, E 2,225; 287 millimicrons, E 1,975.

Analysis.—Calculated for $C_{21}H_{28}O_3$: C, 76.79; H, 8.60. Found: C, 77.19; H, 8.73.

Fractions 14 through 17 inclusive were also combined to give 2.99 grams of material which was recrystallized from 2-propanol and thereupon several times from ethyl acetate to give an analytical sample of melting point 138 to 139 degrees centigrade of pure 3-hydroxy-9//10-seco-1,3,5(10)-pregnatriene-11,20-dione. $[\alpha]_D$ plus 43° (acetone); $\lambda_{max.}^{EtOH}$ 281 millimicrons, E 2,225; 287 millimicrons, E 2,050.

Analysis.—Calculated for $C_{21}H_{28}O_3$: C, 76.79; H, 8.60. Found: C, 77.26; H, 8.24.

Example 2.—3-acetoxy-9//10-seco-1,3,5(10)-pregnatriene-11,20-dione

A solution containing 200 milligrams of 3β-hydroxy-9//10 - seco - 1,3,5(10) - pregnatriene - 11,20 - dione in 1.5 milliliters of acetic anhydride and 1.5 milliliters of pyridine was warmed on a steam bath for a period of 1.5 hours. The cooled mixture was thereupon poured into water under vigorous stirring. The crude product obtained by filtration was dried and recrystallized from ethyl acetate-Skellysolve B hexanes to give 200 milligrams (87.5 percent yield) of 3-acetoxy - 9//10 - seco-1,3,5(10)-pregnatriene-11,20-dione of melting point 139 to 140 degrees centigrade. $\lambda_{max.}^{EtOH}$ 268 millimicrons, E 558; 274.5 millimicrons, E 548.

Example 3.—3-acetoxy-9//10-seco-1,3,5(10)-isopregnatriene-11,20-dione

In the same manner as described in Example 2, 3-hydroxy - 9//10 - seco - 1,3,5(10) - isopregnatriene - 11,20-dione was acetylated with acetic anhydride in pyridine to produce 3-acetoxy - 9//10 - seco-1,3,5(10)-isopregnatriene-11,20-dione of melting point 91 to 93 degrees centigrade and $\lambda_{max.}^{EtOH}$ 268 millimicrons, E 555; 274.5 millimicrons, E 540.

Example 4.—3-propionyloxy-9//10-seco-1,3,5(10)-pregnatriene-11,20-dione

In the same manner given in Example 2 by heating 3-hydroxy - 9//10 - seco - 1,3,5(10) - pregnatriene - 11,20-dione in pyridine with propionic anhydride, 3-propionyloxy - 9//10 - seco - 1,3,5(10) - pregnatriene - 11,20 - dione is obtained.

Example 5.—3-butyryloxy-9//10-seco-1,3,5(10)-pregnatriene-11,20-dione

In the same manner given in Example 2 by heating 3-hydroxy - 9//10 - seco - 1,3,5(10) - pregnatriene - 11,20-dione in pyridine with butyric anhydride, 3-butyryloxy-9//10 - seco - 1,3,5(10) - pregnatriene - 11,20 - dione is obtained.

Example 6.—3-valeryloxy-9//10-seco-1,3,5(10)-pregnatriene-11,20-dione

In the same manner given in Example 2 by heating 3-hydroxy - 9//10 - seco - 1,3,5(10) - pregnatriene - 11,20-dione in pyridine with valeryl anhydride, 3-valeryloxy-9//10 - seco - 1,3,5(10) - pregnatriene - 11,20 - dione is obtained.

Example 7.—3-hexanoyloxy-9//10-seco-1,3,5(10)-pregnatriene-11,20-dione

In the same manner given in Example 2 by heating 3-hydroxy - 9//10 - seco - 1,3,5(10) - pregnatriene - 11,20-dione in pyridine with hexanoyl chloride, 3-hexanoyloxy-9//10 - seco - 1,3,5(10) - pregnatriene - 11,20 - dione is obtained.

Example 8.—3-benzoyloxy-9//10-seco-1,3,5(10)-pregnatriene-11,20-dione

In the same manner given in Example 2 by heating 3-hydroxy - 9//10 - seco - 1,3,5(10) - pregnatriene - 11,20-dione in pyridine with benzoyl chloride, 3-benzoyloxy-9//10 - seco - 1,3,5(10) - pregnatriene - 11,20 - dione is obtained.

Example 9.—3-salicyloyloxy-9//10-seco-1,3,5(10)-pregnatriene-11,20-dione

In the same manner given in Example 2 by heating 3-hydroxy - 9//10 - seco - 1,3,5(10) - pregnatriene - 11,20-dione in pyridine with salicyloyl bromide, 3-salicyloyloxy-9//10 - seco - 1,3,5(10) - pregnatriene - 11,20 - dione is obtained.

Example 10.—3-(2-furoyloxy)-9//10-seco-1,3,5(10)-pregnatriene-11,20-dione

In the same manner given in Example 2 by heating 3-hydroxy - 9//10 - seco - 1,3,5(10) - pregnatriene - 11,20-dione in pyridine with 2-furoyl chloride, 3-(2-furoyloxy)-9//10 - seco - 1,3,5(10) - pregnatriene - 11,20 - dione is obtained.

Example 11.—3-nicotinyloxy-9//10-seco-1,3,5(10)-pregnatriene-11,20-dione

In the same manner given in Example 2 by heating 3-hydroxy - 9//10 - seco - 1,3,5(10) - pregnatriene - 11,20-dione in pyridine with nicotinyl chloride, 3-nicotinyloxy-9//10 - seco - 1,3,5(10) - pregnatriene - 11,20 - dione is obtained.

Example 12.—3-toluyloxy-9//10-seco-1,3,5(10)-pregnatriene-11,20-dione

In the same manner given in Example 2 by heating 3-hydroxy - 9//10 - seco - 1,3,5(10) - pregnatriene - 11,20-dione in pyridine with toluyl chloride, 3-toluyloxy-9//10-seco-1,3,5(10)-pregnatriene-11,20-dione is obtained.

Example 13.—3-hemisuccinyloxy-9//10-seco-1,3,5(10)-pregnatriene-11,20-dione

In the same manner given in Example 2 by heating 3-hydroxy - 9//10 - seco - 1,3,5(10) - pregnatriene - 11,20-dione in pyridine with hemisuccinyl chloride, 3-hemisuccinyloxy - 9//10 - seco - 1,3,5(10) - pregnatriene - 11,20-dione is obtained.

Example 14.—3-cinnamyloxy-9//10-seco-1,3,5(10)-pregnatriene-11,20-dione

In the same manner given in Example 2 by heating 3 - hydroxy-9//10-seco-1,3,5(10)- pregatriene-11,20-dione in pyridine with cinnamyl chloride, 3-cinnamyloxy-9/10-seco-1,3,5(10)-pregnatriene-11,20-dione is obtained.

*Example 15.—3-propionyloxy-9//10-seco-1,3,5(10)-isopregnatriene-11,20-dione*

In the same manner given in Example 2 by heating 3-hydroxl-9//10-seco-1,3,5(10)-isopregnatriene-11,20-dione in pyridine with propionic anhydride, 3-propionyloxy-9//10-seco-1,3,5(10)-isopregnatriene-11,20-dione is obtained.

*Example 16.—3-valeryloxy-9//10-seco-1,3,5(10)-isopregnatriene-11,20-dione*

In the same manner given in Example 2 by heating 3-hydroxy-9//10-seco - 1,3,5(10) - isopregnatriene - 11,20-dione inpyridine with valeryl anhydride, 3 - valeryloxy-9//10 - seco - 1,3,5(10) - isopregnatriene - 11,20 - dione is obtained.

*Example 17.—3-benzoyloxy - 9//10 - seco-1,3,5(10)-isopregnatriene-11,20-dione*

In the same manner given in Example 2 by heating 3-hydroxy-9//10 - seco - 1,3,5(10) - isopregnatriene - 11,20-dione in pyridine with benzoyl chloride, 3 - benzoyloxy-9//10 - seco - 1,3,5(10) - isopregnatriene - 11,20-dione is obtained.

*Example 18.—3 - (β - cyclopentylpropionlyoxy) - 9//10-seco-1,3,5(10)-isopregnatriene-11,20-dione*

In the same manner given in Example 2 by heating 3-hydroxy - 9//10 - seco - 1,3,5(10) - isopregnatriene-11,20-dione in pyridine with β - cyclopentylpropionyl bromide, 3 - (β - cyclopentylpropinoyloxy) - 9//10 - seco - 1,3,5(10) - isopregnatriene - 11,20 - dione is obtained.

*Example 19.—3 - phenylacetoxy - 9//10-seco-1,3,5(10)-isopregnatriene-11,20-dione*

In the same manner given in Example 2 by heating 3-hydroxy - 9//10 - seco - 1,3,5(10) - isopregnatriene-11,20 - dione in pyridine with phenylacetyl chloride, 3-phenylacetoxy - 9//10 - seco - 1,3,5(10) - isopregnatriene-11,20-dione is obtained.

*Example 20.—3 - toluenesulfonyloxy - 9//10 - seco-1,3,5(10)-isopregnatriene-11-20-dione*

In the same manner given in Example 2 by heating 3-hydroxy - 9//10 - seco - 1,3,5(10) - isopregnatriene-11,20-dione in pyridine with toluenesulfonyl chloride, 3-toluenesulfonyloxy - 9//10 - seco - 1,3,5(10) - isopregnatriene - 11,20 - dione is obtained.

In the manner of Examples 2 through 20, inclusive, other esters such as organic carboxylic acid and especially hydrocarbon carboxyl acid esters of 3-hydroxy - 9//10-seco - 1,3,5(10) - pregnatriene - 11,20 - dione and 3-hydroxy - 9//10 - seco - 1,3,5(10) - isopregnatriene - 11,20-dione may be made by reacting the corresponding acid anhydride or acyl halide preferably in pyridine with 3-hydroxy - 9//10 - seco - 1,3,5(10) - pregnatriene - 11,20-dione or its isomer, 3 - hydroxy - 9//10 - seco - 1,3,5(10)-isopregnatriene - 11,20 - dione, respectively. Representative 3 - acyloxy - 9//10 - seco - 1,3,5(10 - pregnatriene-11,20 - diones and 3 - acyloxy - 9//10-seco-1,3,5(10)-isopregnatriene - 11,20 - diones thus obtained include those compounds containing in the 3-position acyloxy groups such as, formyloxy, acetoxy, propionyloxy, butyryloxy, isobutyryloxy, valeryloxy, isovaleryloxy, hexanoyloxy, heptanoyloxy, octanoyloxy, benzoyloxy (β - cyclopentylpropionyloxy), dimethylacetoxy, trimethylacetoxy, phenylacetoxy, toluyloxy, anisoyloxy, gallyloxy, silicyloyloxy, cinnamyloxy, hemisuccinyloxy, hemidimethylglutaryloxy, hemitartaryloxy, dihydrogencityloxy, hemimaleyloxy, hemifumaryloxy, crotonyloxy, acrylyloxy, β-methylcrotonyloxy, cyclohexanecarbonyloxy, chloroacetoxy, dichloroacetoxy, trichloroacetoxy, bromoacetoxy, hemiquinolinoyloxy, nicotinyloxy, piperonyloxy, 2-furoyloxy, thioglycollyloxy, para-chlorobenzoyloxy, para-bromobenzoyloxy, meta-nitrobenzoyloxy (3,5-dinitrobenzoyl-oxy), benzenesulfonyloxy, para-chlorobenzenesulfonyloxy, para-toluenesulfonyloxy, para-nitrobenzenesulfonyloxy, 3,5-dinitrobenzenesulfonyloxy, benzenephosphonyloxy, and the like.

*Example 21.—3β - hydroxy - 9//10 - seco - 1,3,5(10)-pregnatriene - 11,20 - dione by isomerization of 3-hydroxy - 9//10 - seco - 1,3,5(10) - isopregnatriene-11,20-dione*

A solution of 230 milligrams of 3-hydroxy-9//10-seco-1,3,5(10)-isopregnatriene-11,20-dione, dissolved in six milliliters of ethanol and 0.6 milliliter of concentrated hydrochloric acd, was heated under reflux for a period of thirty minutes. Thereafter the solvent was evaporated under vacuum and the product was recrystallized from ethyl acetate-Skellysolve B hexanes to give ninety milligrams of crude material which upon recrystallization from the same solvent gave fifty milligrams of 3β-hydroxy-9//10 - seco - 1,3,5(10) - pregnatriene - 11,20 - dione of melting point 133 to 135.5 degrees centigrade. An additional amuont of ninety milligrams was obtained from the solvent used in recrystallization giving a total yield of 78.5 percent of crude 3β-hydroxy-9//10-seco-1,3,5(10)-pregnatriene-11,20-dione.

*Example 22.—Partial isomerization of 3-hydroxy-9//10-seco - 1,3,5(10) - pregnatriene - 11,20-dione to 3-hydroxy - 9//10 - seco - 1,3,5(10)-isopregnatriene-11,20-dione*

A solution of 100 milligrams of 3-hydroxy-9//10-seco-1,3,5(10)-pregnatriene-11,20-dione, dissolved in five milliters of five percent aqueous sodium hydroxide solution was heated to boiling and permitted to stand for a period of four hours. Acidification of the solution with dilute hydrochloric acid gave an oil which was found to consist of 75 percent of the starting material and 25 percent of 3 - hydroxy - 9//10 - seco - 1,3,5(10) - isopregnatriene-11,20-dione.

In a similar manner fifty milligrams of 3-hydroxy-9//10 - seco - 1,3,5(10) - pregnatriene - 11,20 - dione free from the corresponding isopregnatriene compound, as shown by papergram, was heated to 360 degrees centigrade for a period of fifteen minutes to give a 36 percent yield of 3-hydroxy-9//10-seco-1,3,5(10)-isopregnatriene-11,20-dione.

*Example 23.—3 - methoxy - 9//10 - seco - 1,3,5(10)-pregnatriene-11,20-dione*

To a solution of two grams of 3-hydroxy-9//10-seco-1,3,5(10)-pregnatriene-11,20-dione, dissolved in fifteen milliliters of methanol denatured alcohol and heated to seventy degrees centigrade, was added, at five minute intervals, one milliliter of sodium hydroxide solution containing 400 milligrams of anhydrous sodium hydroxide per milliliter of water, and one milliliter of dimethyl sulfate. The additions were repeated five times and thereafter the solution was poured into water and the methyl ether extracted with methylene dichloride. After washing the methylene dichloride solution with water and drying over anhydrous sodium sulfate, the solvent was evaporated to give 2.10 grams of oily 3-methoxy-9//10-seco-1,3,5(10)-pregnatriene-11,20-dione.

*Example 24.—11α- and 11β-hydroxy-9//10-secoprogesterone and 11-keto-9//10-secoprogesterone*

A solution of two grams of 3-methoxy-9//10-seco-1,3,5(10)-pregnatriene-11,20-dione in 120 milliliters of benzene, 300 milligrams of para-toluenesulfonic acid, and two grams of ethylene glycol were heated for a period of four hours at reflux temperature. Thereafter the solvent and unused ethylene glycol were removed by distillation under reduced pressure. The remaining oily liquid was the 20-monoethylene ketal of 3-methoxy-9//10-seco-1,3,5(10)-pregnatriene-11,20-dione. Recrystallization from ethyl-acetate-Skellysolve B hexanes failed to convert the oil to crystalline 20-monoethylene ketal of 3-methoxy-9//10-seco-1,3,5(10) - pregnatriene - 11,20-dione. If desired the small amounts of 11,20-diketal of 3-methoxy-9//10-seco-1,3,5(10) - pregnatriene - 11,20-dione may be separated from the 20-monoketal by chromatography.

The thus obtained 3-methoxy-9//10-seco-1,3,5(10)-pregnatriene-11,20-dione 20-ethylene monoketal was dissolved in fifty milliliters of ethanol and stirred thereupon into 600 milliliters of liquid ammonia. To this solution was added six grams of lithium in small pieces under rapid stirring. Thereafter, the reaction mixture was decomposed with 100 milliliters of water, and evaporated under reduced pressure to a volume of 110 milliliters. The solution was acidified with hydrochloric acid having an excess of hydrochloric acid so that a five percent acidic solution was obtained. This solution, containing a suspension, was then shaken with sixty milliliters of ethyl acetate which dissolved the solids while the hydrolysis proceeded. The ethyl acetate solution was washed with water, dried over anhydrous sodium sulfate and evaporated under reduced pressure. The remaining residue was taken up in ten milliliters of ethyl acetate and chromatographed on Florisil magnesium silicate in the same solvent. The main fraction from the chromatographic separation was evaporated and the solids were added to a solution of thirty milliliters of ethanol containing thirty milligrams of sodium hydroxide. This mixture was kept at a temperature of fifty degrees for five minutes under a nitrogen atmosphere. After acidification with a few drops of acetic acid the solvent was removed under reduced pressure and the residue washed with water, taken up in ten milliliters of ethyl acetate and chromatographed over aluminum in ethyl acetate. The first fractions thus obtained consisted of 11α-hydroxy-9//10-secoprogesterone 20-ethylene monoketal.

25 milligrams of 11α-hydroxy-9//10-secoprogesterone 20-ethylene monoketal was dissolved in one milliliter of ethanol containing four drops of water and one drop of sulfuric acid and the mixture was boiled five minutes. Thereafter the reaction mixture was neutralized and evaporated to dryness. The product was washed with water and recrystallized from ethanol to give 11α-hydroxy-9//10-secoprogesterone.

The remainder of the solid 11α-hydroxy-9//10-secoprogesterone 20-ethylene monoketal was dissolved in twelve milliliters of acetic acid and thereto was added 400 milligrams of chromic anhydride. The mixture was allowed to remain at room temperature under continuous shaking for a period of two hours. Thereafter the reaction mixture was poured onto fifty milliliters of ice and the solid 11 - keto - 9//10 - secoprogesterone 20-ethylene monoketal was collected on the filter, washed with water and recrystallized from ethyl acetate and Skellysolve B hexanes.

11-keto-9//10-secoprogesterone 20-ethylene monoketal (25 milligrams) was hydrolyzed in the manner described for the 11α-hydroxy-9//10-secoprogesterone 20-ethylene monoketal to give, after recrystallization from Skellysolve B-hexanes and ethyl acetate, pure 11-keto-9//10-secoprogesterone.

The remaining amount of 11-keto-9//10-secoprogesterone 20-ethylene monoketal was dissolved in fifty milliliters of ether and admixed thereafter with 25 milliliters of tetrahydrofuran containing 0.5 gram of lithium aluminum hydride. The mixture was heated under reflux for a period of one hour, then cooled to room temperature and diluted with 25 milliliters of 25 percent aqueous sulfuric acid. The thus obtained reaction mixture was heated for a period of ten minutes on the steam bath, thereafter cooled and neutralized with sodium hydroxide. The neutral solution was extracted with methylene dichloride, the extracts were repeatedly washed with water, dried over anhydrous sodium sulfate and evaporated to give a solid residue. The mixture containing 11α-hydroxy- and 11β-hydroxy-9//10-secoprogesterone was chromatographed to separate 11α-hydroxy from 11β-hydroxy-9//10-secoprogesterone.

Example 25.—17α-hydroxy-11β,21-diacetoxy-9//10-seco-4-pregnene-3,20-dione (9//10-seco-hydrocortisone diacetate)

Nineteen milliliters of ethyl oxalate and 21.2 milliliters of a 2.2 normal methanolic solution of sodium methoxide was added to a solution of 6.8 grams of 11β-hydroxy-9//10-secoprogesterone, dissolved in 100 milliliters of anhydrous tertiary butyl alcohol, at about fifty degrees centigrade. The mixture was maintained for a period of three hours at twenty to thirty degrees centigrade whereafter the precipitated sodium dienolate of 2,21-diethoxy-oxalyl-11β-hydroxy-9//10-secoprogesterone was filtered, washed with ether and dissolved in water. The aqueous solution was acidified with dilute hydrochloric acid and the precipitate was filtered therefrom and then dried to give 2,21-diethoxyoxalyl-11β-hydroxy-9//10-secoprogesterone, a yellow amorphous powder which exhibited a reddish color in alcoholic ferric chloride solution and an infrared spectrum confirming the structure.

A solution of eight grams of 2,21-diethoxyoxalyl-11β-hydroxy-9//10-secoprogesterone and 5.9 grams of anhydrous potassium acetate in 140 milliliters of methanol was cooled to zero degrees centigrade in an ice-bath and a solution of 7.4 grams (0.46 mole) of bromine in 74 milliliters of methanol was then added dropwise thereto over a period of about one-half hour thus producing 2,21,21-tribromo-2,21-diethoxyoxalyl-3-keto-11β-hydroxy-9//10-secoprogesterone. To this mixture was then added about fifty milligrams of phenol and 67 milliliters of a 1.5 normal methanolic solution of sodium methoxide. The mixture was heated for five minutes on a steam bath, then cooled and thereupon poured into water. The resulting flocculent, white precipitate of 2-bromo-11β-hydroxy - 9//10 - seco - 4,17(20)-pregnadiene-21-oic acid methyl ester was thoroughly washed with water and dried in a vacuum desiccator. The thus produced crude 2-bromo-3-keto-11β-hydroxy-9//10-seco-4,17(20) - pregnadiene-21-oic acid methyl ester was chromatographed from benzene, benzene-Skellysolve B hexanes and Skellysolve B hexanes and acetone. The Skellysolve B hexanes plus acetone eluates contained the desired 2-bromo-3-keto-11β-hydroxy - 9//10 - seco - 4,17(20)-pregnadiene-21-oic acid methyl ester.

To a solution of three grams of 2-bromo-3-keto-11β-hydroxy-9//10-seco-4,17(20) - pregnadiene - 21 - oic acid methyl ester, dissolved in a mixture of sixty milliliters of benzene, 25 milliliters of methanol, and five milliliters of acetic acid, was added 2.4 grams of zinc dust and the whole was stirred vigorously for a period of four hours. The solid material was filtered off, washed with warm benzene, and the benzene washings added to the filtrate and the whole, filtrate and washings combined, then washed successively with sixty milliliters of water, sixty milliliters of a saturated sodium bicarbonate solution and 25 milliliters of water. The resulting solution was thereupon dried and the solvent distilled to give crude 3-keto-11β-hydroxy-9//10-seco-4,17(20)-pregnadiene-21-oic acid methyl ester which was purified by recrystallization from hot ethyl acetate and Skellysolve B hexane hydrocarbons to yield pure 3-keto-11β-hydroxy-9//10-seco-4,17(20)-pregnadiene-21-oic acid methyl ester.

A solution of two grams of 3-keto-11β-hydroxy-9//10-seco-4,17(20)-pregnadiene-21-oic acid methyl ester, two milliliters of pyrolidine, and 250 milliliters of benzene was heated at a reflux temperature for a period of six hours during which time the water formed in the reaction was removed from the reaction mixture by codistillation with benzene. The benzene was then removed by distillation under reduced pressure. The thus obtained residue was triturated in methanol to give 85 percent of a compound which was recrystallized from ethyl acetate and Skellysolve B to give 3-(N-pyrrolidyl)-11β-hydroxy-9//10-seco-3,5,17(20)-pregnatriene-21-oic acid methyl ester.

Two grams of 3-(N-pyrrolidyl)-11β-hydroxy-9//10-seco-3,5,17(20)-pregnatriene-21-oic acid methyl ester, dissolved in 150 milliliters of benzene, was mixed at ten degrees centigrade with two grams of lithium aluminum hydride in 100 milliliters of ether by dropwise addition thereto. The resulting mixture was maintained at about ten degrees centigrade for one-half hour. Thereafter fifty milliliters of water was added dropwise. The organic solvent layer was separated and the solvent was removed from it. The thus obtained residue was triturated with ethyl acetate and thereafter recrystallized from methanol to give 3-pyrrolidyl-11β,21-dihydroxy-9//10-seco-3,5,17-(20)-pregnatriene.

A suspension of one gram of 3-(N-pyrrolidyl)-11β,21-dihydroxy-9//10-seco-3,5,17(20)-pregnatriene in 125 milliliters of methanol was heated at 35 to 40 degrees centigrade with seven milliliters of a five percent aqueous sodium hydroxide solution until solution was complete. The time of heating was less than ten minutes. The resulting solution was cooled, neutralized with acetic acid and the solvent distilled at reduced pressure. The residue thus obtained was mixed with water and repeatedly extracted with ether. The ether extract after evaporation of the solvent and recrystallization of the residue from ethyl acetate yielded pure 11β,21-dihydroxy-9//10-seco-4,17(20)-pregnadien-3-one.

A solution containing 11β,21-dihydroxy-9//10-seco-4,17(20)-pregnadien-3-one in ten milliliters of pyridine and five milliliters of acetic anhydride was allowed to stand at room temperature for a period of two hours. Thereafter the mixture was poured over 100 milliliters of ice water and the resulting precipitate collected on a filter. This precipitate was recrystallized from Skellysolve B hexane ethyl acetate mixtures to give pure 11β,21-diacetoxy-9//10-seco-4,17(20)-pregnadien-3-one.

To a solution of one gram of 11β,21-diacetoxy-9//10-seco-4,17(20)-pregnadien-3-one in fifty milliliters of tertiary butyl alcohol was added at room temperature (twenty to thirty degrees centigrade) nine milliliters of a 0.65 molar solution of hydrogen peroxide in sodium dried tertiary butyl alcohol followed by the dropwise addition of 75 milligrams of osmium tetroxide in eight milliliters of sodium dried tertiary butyl alcohol over a period of eight hours. The resulting mixture was maintained at room temperature for an additional 48 hours and was thereafter worked up as follows: One gram of sodium sulfite dissolved in 25 milliliters of water was added, and after stirring for five minutes the resulting mixture was concentrated to about twenty milliliters by distillation at a pressure of about fifty millimeters of mercury absolute and the resulting concentrate then extracted with methylene chloride. A methylene chloride extract was dried over anhydrous sodium sulfite and chromatographed over 125 grams of synthetic magnesium silicate (Florisil). The column was developed with ethylene chloride containing increasing amounts of acetone. The fractions containing the 17α-hydroxy-11β,21-diacetoxy-9//10-seco-4-pregnene-3,20-dione (9//10-seco-hydrocortisone diacetate) were collected, combined, evaporated after drying over anhydrous sodium sulfate and the residue recrystallized from acetone Skellysolve B hexanes to give pure 9//10-seco-hydrocortisone diacetate.

*Example 26.—17α-hydroxy-21-acetoxy-9//10-seco-4-pregnene-3,11,20-trione (9//10-seco-cortisone acetate)*

One-half gram of 11β,17α-dihydroxy-21-acetoxy-9//10-seco-4-pregnene-3,20-dione was dissolved in five milliliters of acetic acid. To this solution was added 0.200 gram of chromic anhydride, dissolved in two milliliters of acetic acid. The solution was repeatedly shaken and maintained at room temperature (twenty to thirty degrees centigrade) for a period of four hours. Thereafter the material was poured onto fifty milligrams of ice and the resulting precipitate collected on filter paper, washed with water, and recrystallized from methanol to give pure 17α-hydroxy-21-acetoxy-9//10-seco-4-pregnene-3,11,20-trione.

9//10-seco-hydrocortisone and 9//10-seco-cortisone are prepared from the corresponding 9//10-seco-hydrocortisone acetate and 9//10-seco-cortisone acetate by hydrolyzing these compounds in methyl or ethyl alcohol in the presence of sodium or potassium hydroxide, methoxide, or ethoxide, under a nitrogen atmosphere at temperatures between fifteen and fifty degrees centigrade.

Other esters of 9//10-seco-hydrocortisone and 9//10-seco-cortisone are obtained by acylating the corresponding 11β,17α,21-trihydroxy-9//10-seco-4-pregnene-3,20-dione and 17α,21-dihydroxy-9//10-seco-4-pregnene-3,11,20-trione in conventional manner such as by heating these compounds in pyridine solution with the acid chlorides, acid bromides or acid anhydrides of hydrocarbon carboxylic acids containing from one to eight carbon atoms, or other carboxylic acids containing from one to eight carbon atoms, to obtain the corresponding 11β,17α-dihydroxy-21-acyloxy-9//10-seco-4-pregnene-3,20-dione and 17α-hydroxy-21-acyloxy-9//10-seco-4-pregnene-3,11,20-trione, wherein the acyloxy groups are for example, formyloxy, acetoxy, propionyloxy, butyryloxy, isobutyryloxy, valeryloxy, isovaleryloxy, hexanoyloxy, heptanoyloxy, octanoyloxy, benzoyloxy (β-cyclopentylpropionyloxy), dimethylacetoxy, trimethylacetoxy, phenylacetoxy, toluyloxy, anisoyloxy, gallyloxy, salicyloyloxy, cinnamyloxy, hemisuccinyloxy, hemitartaryloxy, dihydrogencitryloxy, hemimaleyloxy, hemifumaryloxy, crotonyloxy, acryloxy, β-methylcrotonyloxy, cyclohexanecarbonyloxy, chloroacetoxy, dichloroacetoxy, trichloroacetoxy, bromoacetoxy, hemiquinolinoyloxy, nicotinyloxy, piperonyloxy, 2-furoyloxy, thioglycollyloxy, para-chlorobenzoyloxy, para-bromobenzoyloxy, meta-nitrobenzoyloxy (3,5-dinitrobenzoyloxy), and the like.

It is to be understood that this invention is not to be limited to the exact details of operation or exact compounds shown and described as obvious modifications and equivalents will be apparent to one skilled in the art and the invention is therefore to be limited only by the scope of the appended claims.

We claim:

1. A 9//10-secosteroid selected from the group consisting of 3-hydroxy-9//10-seco-1,3,5(10)-pregnatriene-11,20 - dione, 3 - hydroxy - 9//10 - seco - 1,3,5(10) - isopregnatriene - 11,20 - dione, 3 - acyloxy - 9//10 - seco-1,3,5(10) - pregnatriene - 11,20 - dione and 3 - acyloxy-9//10 - seco - 1,3,5(10) - isopregnatriene - 11,20 - dione wherein the acyl group is the acyl radical of a hydrocarbon carboxylic acid containing from one to eight carbon atoms, inclusive.

2. 3 - hydroxy - 9//10 - seco - 1,3,5(10) - pregnatriene-11,20-dione.

3. 3 - hydroxy - 9//10 - seco - 1,3,5(10) - isopregnatriene-11,20-dione.

4. A 3 - acyloxy - 9//10 - seco - 1,3,5(10) - pregnatriene-11,20-dione wherein the acyl group is the acyl radical of a hydrocarbon carboxylic acid containing from one to eight carbon atoms, inclusive.

5. 3 - acetoxy - 9//10 - seco - 1,3,5(10) - pregnatriene-11,20-dione.

6. 3 - benzoyloxy - 9//10 - seco - 1,3,5(10) - pregnatriene-11,20-dione.

7. A 3 - acyloxy - 9//10 - seco - 1,3,5(10) - isopregnatriene-11,20-dione wherein the acyl group is the acyl radical of a hydrocarbon carboxylic acid containing from one to eight carbon atoms, inclusive.

8. 3 - acetoxy - 9//10 - seco - 1,3,5(10) - isopregnatriene-11,20-dione.

9. A process for the preparation of a separable mixture of 3 - hydroxy - 9//10 - seco - 1,3,5(10) - pregnatriene- 11,20 - dione and 3 - hydroxy - 9//10 - seco - 1,3,5(10)- isopregnatriene-11,20-dione which comprises: pyrolysis of 11-ketoprogesterone by heating 11-ketoprogesterone to a temperature between about 250 and 425 degrees centigrade, separating the thus produced phenolic fraction from the neutral fraction through extraction with an aqueous alkali base solution and acidifying said aqueous alkali solution with an acid to obtain a separable mixture of 3 - hydroxy - 9//10 - seco - 1,3,5(10) - pregnatriene - 11,20- dione and 3 - hydroxy - 9//10 - seco - 1,3,5(10) - isopregnatriene-11,20-dione.

10. A process for the preparation of a separable mixture of 3 - hydroxy - 9//10 - seco - 1,3,5(10) - pregnatriene - 11,20 - dione and 3 - hydroxy - 9//10 - seco- 1,3,5(10) - isopregnatriene - 11,20 - dione which comprises: pyrolysis of 11 - ketopregesterone by heating 11-ketoprogesterone to a temperature between about 350 to about 400 degrees centigrade for a period of about one half to one and one half hours, separating the thus obtained phenolic fraction from the thus obtained neutral fraction through extraction with an aqueous alkali-metal hydroxide solution and acidifying said alkali-metal hydroxide solution with dilute mineral acid to obtain a separable mixture of 3 - hydroxy - 9//10 - seco - 1,3,5(10)- pregnatriene - 11,20 - dione and 3 - hydroxy - 9//10 - seco- 1,3,5(10)-isopregnatriene-11,20-dione.

References Cited in the file of this patent

Pincus et al.: "The Hormones," vol. III, pp. 539 and 540. Academic Press, 1955.